(12) United States Patent
Hauser

(10) Patent No.: US 11,847,664 B2
(45) Date of Patent: Dec. 19, 2023

(54) SYSTEM AND METHOD FOR PREDICTIVE PRODUCT PRICING BASED ON PRODUCT DESCRIPTION

(71) Applicant: Genpact Luxembourg S.à r.l. II, Luxembourg (LU)

(72) Inventor: David I. Hauser, Merrick, NY (US)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 53 days.

(21) Appl. No.: 17/526,925

(22) Filed: Nov. 15, 2021

(65) Prior Publication Data

US 2023/0153850 A1 May 18, 2023

(51) Int. Cl.
*G06Q 30/0201* (2023.01)
*G06F 40/205* (2020.01)
*G06N 3/08* (2023.01)

(52) U.S. Cl.
CPC ....... *G06Q 30/0206* (2013.01); *G06F 40/205* (2020.01); *G06N 3/08* (2013.01)

(58) Field of Classification Search
CPC ..... G06Q 30/0206; G06F 40/205; G06N 3/08
USPC ....................................................... 705/7.35
See application file for complete search history.

(56) References Cited

U.S. PATENT DOCUMENTS

| | | | | |
|---|---|---|---|---|
| 11,526,756 B1 * | 12/2022 | Arici | ............... | G06N 3/045 |
| 2003/0065586 A1 * | 4/2003 | Shaftel | ............... | G06Q 30/0641 |
| | | | | 705/27.1 |
| 2009/0077059 A1 * | 3/2009 | Torres | ............... | G06Q 40/00 |
| | | | | 707/999.005 |
| 2018/0336638 A1 * | 11/2018 | Dziabiak | ............... | G06F 7/08 |
| 2020/0020014 A1 * | 1/2020 | Jin | ............... | G06N 5/046 |
| 2022/0198562 A1 * | 6/2022 | Cella | ............... | G06Q 40/04 |
| 2022/0284460 A1 * | 9/2022 | Oosugi | ............... | G06Q 10/04 |
| 2023/0071641 A1 * | 3/2023 | Leigh | ............... | G06Q 30/0204 |

OTHER PUBLICATIONS

Kalaiselvi.N "Retail Price Analytics Using Backpropogation Neural Network and Sentimental Analysis" IEEE 2017 4th International Conference on Signal Processing, Communications and Networking (ICSCN—2017), Mar. 16-18, 2017, Chennai, India (Year: 2017).*

* cited by examiner

*Primary Examiner* — Abdallah A El-Hage Hassan
(74) *Attorney, Agent, or Firm* — Goodwin Procter LLP

(57) ABSTRACT

A method for predicting, assessing, and auditing prices of products or services is provided. In some embodiments, the method includes receiving a product description with one or more terms and obtaining a product list with product descriptions having respective prices, where each product description in the product list includes the one or more terms or combinations thereof from the received product description. The method further includes, training a model to determine how the one or more terms or combinations thereof influence the prices in the product list, using the trained model to make a price prediction for the received product description, and enabling assessment of product prices based on the price prediction made by the trained model.

20 Claims, 7 Drawing Sheets

Select a Category

Cakes ▼

Showing 1 to 10 of 539 entries

| | Description | Units | Price |
|---|---|---|---|
| 1 | Variety Cake Caramel Red Velvet Chocolate Carrot | 46 OZ PKG | 16.98 |
| 2 | Mini Crumb Cakes - 6 Ct | 12.2 OZ BOX | 4.49 |
| 3 | Little Bites Party Cakes - 5 ct | 8.25 OZ BOX | 4.49 |
| 4 | Cake Chocolate Cappuccino Fudge 4 inch | 12 OZ PKG | 5.99 |
| 5 | Loaf Cake Danish Butter Sliced | 16 OZ PKG | 4.99 |
| 6 | Loaf Cake Marble Sliced | 15 OZ PKG | 4.99 |
| 7 | Yellow Cake with White Buttercream Icing 1/8 Sheet | 31 OZ PKG | 13.99 |
| 8 | Cake Tiramisu 7 inch | 34 OZ PKG | 16.98 |
| 9 | Cake Carrot Double Layer Round 7 inch | 46 OZ PKG | 15.99 |
| 10 | Cake Chocolate Truffle Bomb Round 7 inch | 40 OZ PKG | 17.99 |

Previous 1 2 3 4 5 ... 54 Next

Search:

Show 10 ▼ entries

Fig. 4

SYSTEM AND METHOD FOR PREDICTIVE PRODUCT PRICING BASED ON PRODUCT DESCRIPTION

TECHNICAL FIELD

This disclosure relates to a method and system using machine learning and artificial intelligence to predict, assess, and audit the price of a product based on the product's description.

BACKGROUND

It is common for product prices to be determined by supply and demand rules. However, other pricing strategies are not uncommon, for example, pricing a product in relation to specific competitors, to a category average, purposefully premium pricing, etc. Yet, product pricing, regardless of the selected approach, becomes more complex if the product does not exist. For example, pricing challenges abound for products with a new flavor, a new pack size not yet made available, or for a rebranded product, etc. Determining the price the market would bear for a product based on supply and demand usually requires that the product is already in the market for some time. Hence, new products represent a challenge.

For some retailers, the product may already exist, however, there may be cases where the retailer has never carried the product before. These retailers do not have their own historical supply and demand data from which they can base their pricing strategy. In such a case, it is not uncommon to use a price point from one or more competitors as the basis for determining the price the retailer should consider. However, marketing support, carrying costs, and other conditions that lead to the competitor's price, could be considerably different between retailers and may not be necessarily apply to all of them. Similarly, a manufacturer, who is deciding whether to introduce a new product, may not have an established price point for its new product. This information could be crucial toward the decision to introduce or not the new product.

Further, when procurement teams are negotiating prices for goods from vendors, having a sense of the likely consumer sell price can be critical for the negotiation and decision to carry the products, because procurement prices versus retail prices defines the profit margin. Thus, uncertainty in the profit margin is directly connected to uncertainty in the price the market will bear for the product.

Even after prices are determined for a product, it is not uncommon for products to be mispriced. It is quite possible that the market could easily bear a much higher price or that customers would likely purchase the product at an accelerated rate for a slightly lower price. Thus, determination of the ideal price—e.g., in comparison to the actual chosen price for the product—is also quite informative and valuable.

SUMMARY

To address the aforementioned shortcomings, a method and system for predicting a product price based solely on the product description, whether the product exists or not, is presented. In some embodiments, the price prediction (e.g., determining the most reasonable price given the conditions) is achieved via a purpose-built machine learning (ML) and artificial intelligence (AI) set of models. The initial basis for the models creation is the collection of data. Using natural language processing (NLP), a product's description is decomposed into individual words, bigrams (pairs of words), trigrams (triples of words), quadgrams, etc. and skip grams of different lengths. This word decomposition can be done for each product description and for each unit size. Following traditional recoding approaches used in NLP-based neural network models, each of these decomposed descriptions can be recoded into numbers. According to some embodiments, a deep-learning neural network model having multiple layers is construed to receive the recoded description as input, and is trained to output the product's predicted price. Using hundreds of thousands of products and their prices from a retailer's master price list as training data, the deep-learning neural network model creates a network that predicts the product's price from the coded descriptions. This model is then able to score any new product based only on the product's description.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 4 is a screen shot from a software application showing an exemplary table of products and their prices, according to some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
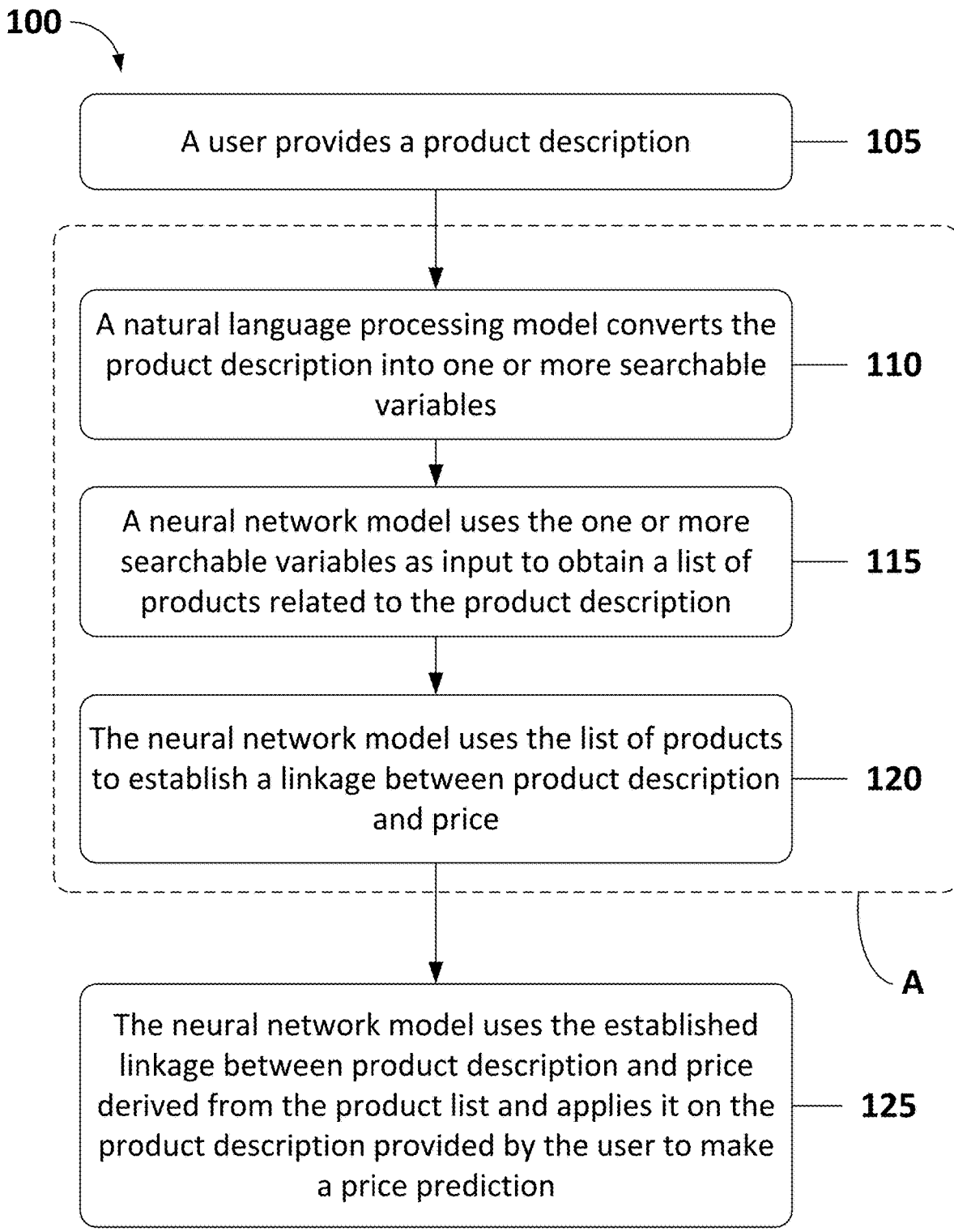
FIG. 1 is a flow chart of a method for predicting the price of a product based on the product's description, according to some embodiments.

According to some embodiments, FIG. 1 is a flow chart of a method 100 for predicting the price for a product based on a product's description. Other operations may be performed between the various operations of method 100 and may be omitted merely for clarity. This disclosure is not limited to this operational description. It is to be appreciated that additional operations may be performed. Moreover, not all operations may be needed to perform the disclosure provided herein. Additionally, some of the operations may be performed simultaneously, or in a different order than that shown in FIG. 1. In some embodiments, one or more other operations may be performed in addition to or in place of the presently described operations.

"Predicting a product's price", "predict" or "prediction", as described herein, in addition to their customary meanings, include determining a reasonable price of a product (in some instances, the most reasonable price of the product) given current market conditions, trends or other factors. A predicted price for a product may not necessarily correspond to what the product might cost in the future, or predict what a product yet to be launched will cost. In some embodiments, the predicted product's price corresponds to a modeled price based on analysis conducted by a model.

Figure 2:
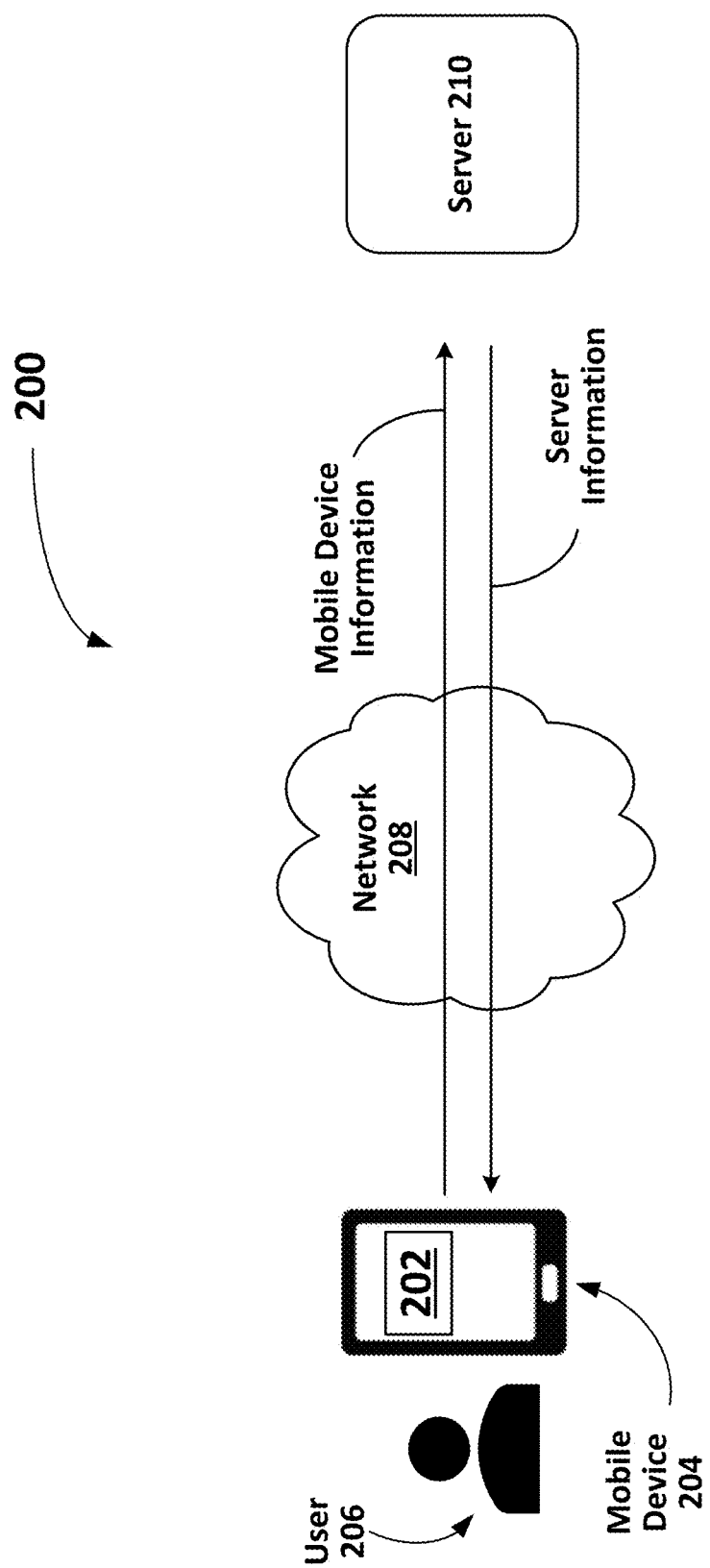
FIG. 2 is a system for predicting the price of a product based on the product's description using the methods described herein, according to some embodiments.

According to some embodiments, the operations of method 100 are executed using an exemplary system 200 shown in FIG. 2. By way of example and not limitation, method 100 can be executed, at least in part, by a software application 202 running on a mobile device 204 operated by a user 206. By way of example and not limitation, mobile device 204 can be a smart phone device, a tablet, a tablet personal computer (PC), or a laptop PC. In some embodiments, mobile device 204 can be any suitable electronic device connected to a network 208 via a wired or wireless connection and capable of running software applications, like software application 202. In some embodiments, mobile device 204 can be a desktop PC running software application 202. In some embodiments, software application 202 is installed on mobile device 204 or is a web-based application running on mobile device 204. By way of example and not limitation, user 206 can be a person providing the product description to software application 202 running on a mobile device 204.

By way of example and not limitation, network 208 can be an intranet network, an extranet network, a local network, a public network, or combinations thereof used by software application 202 to exchange information with one or more remote or local servers, such as server 210. According to some embodiments, software application 202 is configured to exchange information, via network 208, with additional servers that belong to system 200 or other systems similar to system 200 not shown in FIG. 2 for simplicity.

In some embodiments, server 210 is configured to store, process and analyze information received from user 206, via software application 202, and subsequently transmit in real time processed data back to software application 202. Server 210 can include a number of modules and components discussed below in reference to the operations of method 100. According to some embodiments, server 210 performs at least some of the operations discussed in method 100. In some embodiments, server 210 can be a cloud-based server.

In referring to FIG. 1, method 100 begins with operation 105 where a user (e.g., user 206 shown in FIG. 2) provides a product description to software application 202. In some embodiments, the product description is provided in natural language (e.g., in plain English). However, this is not limiting, and software application 202 can be configured to process product descriptions provided in other languages or dialects depending on the local market or geographical region of the user. In some embodiments, the description can be provided in text form (e.g., via typing or copy-pasting the product description in an appropriate search field of software application 202) or via dictation (e.g., with the help of a microphone communicatively coupled to the mobile device 204). Therefore, software application 202 can be configured to receive verbal input, in addition to receiving text input. In some embodiments, the verbal product description is first converted into text prior to being subsequently processed. This can be achieved, for example, via a voice-to-text conversion software application.

In some embodiments, the product description may correspond to any currently existing or non-existing product. In some embodiments, the product description can be a known consumer product or a non-existing product with a novel/new ingredient, flavor, scent, etc. In some embodiments, the product description may also include the desired container size. For example, a product description can be "a 2-liter/gallon/pack/etc. of almond-flavored X," where X can be a recognizable brand name or a product type (e.g., ice-cream, milk, yogurt, etc.).

In some embodiments, the product description may not be limited to everyday consumer products. For example, the product description may relate to specialty goods that possess unique features at an elevated price point—e.g., high-end mobile phone devices; automobiles with new/novel trim options (e.g., drivetrains, technology packages, security features), etc.

In some embodiments, the product description may relate to industrial goods targeting both personal and business use. In some embodiments, the product description may relate to services instead of physical products. For example, it may relate to an airfare option, not previously considered or offered by an airline, with new onboard options and a different/new type of aircraft; or a mobile phone plan with additional features, etc. Thus, any type of products or services can be used with method 100.

For example purposes, method 100 will be described using descriptions from everyday consumer products (e.g., goods) found in supermarkets, such as food products, beverages, detergents, personal care products, cosmetics, and the like. Based on the disclosure herein, method 100 can be used with other types of products and services, as discussed above. These other types of products and services are within the spirit and scope of this disclosure. Consequently, the term "description" as in "product description" equally applies to services as in "service description" if method 100 is applied to a service instead of a physical product. In the latter case, terms such as "product" or "products", as used herein, apply in identical form and function to "service" and "services".

Figure 3:
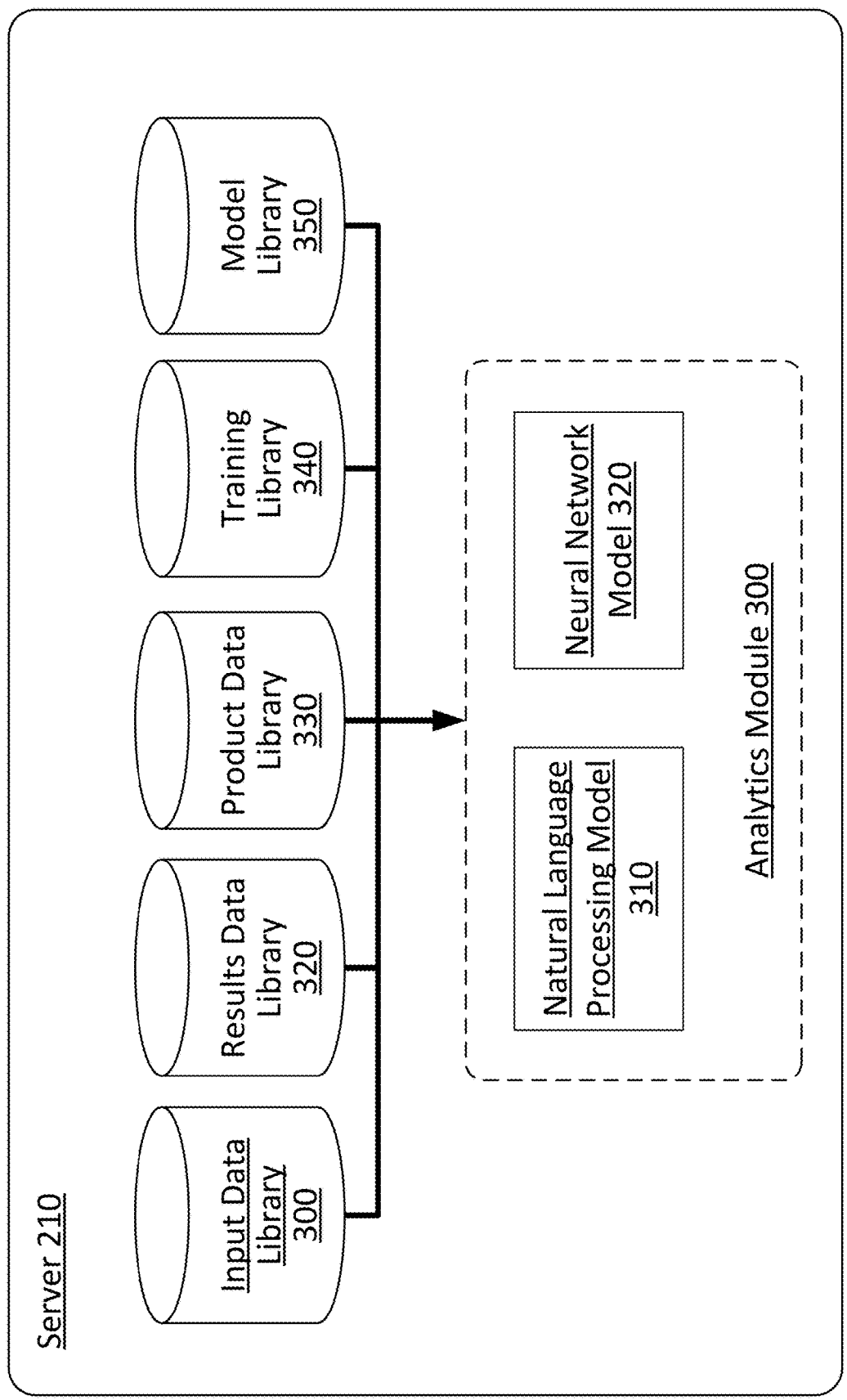
FIG. 3 is a server as part of a system used in a method for predicting the price of a product based on the product's description, according to some embodiments.

By way of example and not limitation, the input information entered to software application by user 206 (i.e., the product description) is saved in an input data library within server 210, such as input data library 300 shown in FIG. 3. According to some embodiments, FIG. 3 shows selective components of server 210 used to perform selective operations of method 100. Server 210 may include additional components not shown in FIG. 3. These additional components, which are omitted merely for simplicity, may include, but are not limited to, computer processing units (CPUs), graphical processing units (GPUs), memory banks, graphic adaptors, external ports and connections, peripherals, power supplies, and the like required for the function and proper operation of server 210. The aforementioned additional components and other components required for the operation of server 210 are within the spirit and the scope of this disclosure. By way of example and not limitation, input data library 300 can be a hard disk drive (HDD), a solid state drive (SSD), a memory bank, or another suitable storage medium to which other components in server 210 can have read and write access.

As discussed above, data transmission from mobile device 204 occurs via network 208, which is used to transfer information between mobile device 204 and server 210 as indicated by the arrows between mobile device 204 and server 210 shown in FIG. 2.

In referring to FIG. 1, method 100 continues with operation 110 where an NLP model or an NLP-based neural network model converts the product description saved in input data library 300 of server 210 into one or more searchable variables. In some embodiments, the conversion includes, for example, text classifiers that parse and sort the text from the product descriptions into individual words, bigrams (e.g., pairs of words), trigrams (e.g., triples of words), quadgrams, and skip grams of different lengths. This word parsing exercise can occur for the entire text of the product description, including any product size information in the product description. Each of these individual words, bigrams, trigrams, quadgrams, and skip grams are recoded, classified, and analyzed following commonly used recoding approaches used in NLP-based neural network models.

In some embodiments, the NLP model is able to recognize and correct spelling errors as the product description is entered into the search field of software application 202. Additionally, the NLP model may be configured to identify key terms (e.g., the brand name of a product) or combinations of terms (e.g., bigrams, trigrams, quadgrams, skip grams, etc.) in the product description and assign to those terms a particular weight, or even prioritize them over other terms or term combinations. Alternatively, the NLP model may be configured to rate each term and term combinations in the product description and assign to them a weight according to a predetermined importance. For example, the NLP model may identify that in the product description banana-chocolate yogurt, the terms banana and chocolate are more important than or equally important as the term yogurt. In another example, the NLP model may identify that bigrams such as banana-chocolate and chocolate yogurt, along with skipgram banana yogurt, influence the product pricing more than the individual words (unigrams) banana, chocolate, and yogurt. Therefore, the aforementioned bigrams and skip gram would be more important than their respective unigrams. Further, the NLP model may be configured to recognize the terms banana and chocolate as flavors of yogurt and use that information accordingly in subsequent operations of method 100 as discussed below. The examples provided above are neither limiting or exhaustive. Thus, additional, more complex combinations and permutations that involve brand names and other product identifiers (e.g., the products' container size) are within the spirit and scope of this disclosure.

By way of example and not limitation, the NLP model used in operation 110 can be located in an analytics module within server 210, like NLP model 310 in analytics module 300 shown in FIG. 3. Accordingly, analytics module 300 of server 210 may include one or more models responsible for processing and analyzing all the information received by server 210. In some embodiments, analytics module 300 in server 210 may include a subset of the models used in method 100, and additional models may be present on other servers communicatively coupled to server 210 not shown in FIG. 3. In some embodiments, analytics module 300 of server 210 may include all the models used in method 100.

By way of example and not limitation, the processed data from NLP model 310 (e.g., the output of NLP model 310) can be saved in a data library, such as results data library 320 shown in FIG. 3. According to some embodiments, results data library 320 (like input data library 300) can be a HDD, a SSD, a memory bank, or any other suitable storage medium to which other components of server 210 can have read and write access.

According to some embodiments, the results from the analysis performed by NLP model 310 are used in-part to generate a list of products whose ingredients, description, or both include the terms (as identified by NLP model 310) from the product description entered in operation 105 of method 100. In the banana-chocolate flavored yogurt example provided above, the table of products may be populated with goods that are available in the market and list banana, chocolate, and combinations thereof as one of their ingredients, or include the terms banana, chocolate, and combinations thereof in their product name. In some embodiments, the user (e.g., user 206) is able to filter the returned results via a threshold slider bar in software application 202 to filter out less relevant products to his/her search. For example, the user may eliminate (e.g., filter out) non-related products to yogurt when a high threshold value is selected. Accordingly, when a low threshold value is selected, the number of products returned increases to include additional products that may be less related to yogurt, but nevertheless include the terms banana, chocolate, yogurt, and combinations thereof. According to some embodiments, intermediate threshold values are possible based on user preference. The retail price and available container sizes for these products are also returned and included as separate columns in the table of products. FIG. 4 shows an exemplary table of products when, for example, the product description cakes is entered in software application 202.

In some embodiments, the information for the product table is collected from publicly available online resources, such as retailer websites, online price master lists, and the like. In some embodiments, the information in the product table is collected in real-time once the product description is entered by the user to obtain most up-to-date product and pricing information. Alternatively, product and pricing information for a large number of products can be downloaded and saved beforehand from online resources. In the latter cases, the downloaded information may be refreshed on a regular basis (e.g., daily, weekly, monthly, etc.) to keep it up-to-date.

In some embodiments, and according to operation 115 of method 100, an artificial neural network model (thereafter "neural network model"), such as neural network model 320 located in analytics module 300 shown in FIG. 3, performs the data collection process described above. In some embodiments, a standalone program routine outside neural network model 320, or even outside server 210, performs the data collection process described above. In some embodiments, the product list and product information is saved in results data library 320 of server 210 where it can be accessed by neural network model 320 and other components of server 210.

In some embodiments, neural network model 320 uses the product list produced above to ascertain whether the terms in the product description—as provided in operation 105 of method 100—result in a price decrease or a price increase for the products in the list (which, as discussed above, may contain any combination of the aforementioned description terms in their product description, ingredients list, or combinations thereof). In addition, neural network model 320 may determine how much the average price of a product decreases or increases when a product in the list contains the description terms or any combination thereof. For example, perhaps strawberry yogurt is more expensive than other yogurts, perhaps strawberry shampoo is less expensive than other shampoos, and perhaps strawberry ice cream is more expensive than other ice creams. Likewise pastries that contain strawberry and raspberry may be sold at higher prices than other pastries, etc.

Therefore, and according to operation 120 of method 100, neural network model 320 uses the list of products to establish a linkage between product description and price by learning how each word in the product description influences the product price both in terms of pricing behavior and average pricing. For this reason, the underlying data can influence the relationships established by the model, and therefore, the resulting price prediction. That is to say, the price predictions provided by the model are as good as the underlying data used by the model.

In some embodiments, additional correlations can be made based on the packaging options offered for the products in the list. For example, and in addition to the price behavior directly related to the product description, certain packaging options may further influence the average price of a product either upwards or downwards. Consequently, neural network model 320 can establish a linkage between product description and product price by learning how each word in the product description influences the product price in combination with the product's packaging offerings.

According to some embodiments, operations 110, 115, and 120 within dashed box A describe a high-level training process for the neural network model. In some embodiments, the neural network model can use regression analysis (e.g., linear or non-linear) or other suitable statistical methods to establish the relationship between product description and price from the product list, which can be used as a training and testing dataset. Parameters of the analysis (e.g., regression coefficients) are adjusted during training until the predicted price for a known product (e.g., for a product from the list) best fits the actual price of that product. In other words, the fitting parameters can be adjusted during the training session until an acceptable fit to real price data is obtained. The training data can include input from any number of products sufficient to obtain reliable statistical data. The aforementioned training method of neural network model 320 is not limited to the above description and alternative methods are within the spirit and the scope of this disclosure. According to some embodiments, flow chart 700 describes the training process for the neural network model and will be described later.

In referring to FIG. 1, method 100 continues with operation 125 where the neural network model (e.g., neural network model 320) uses the established linkage between product description and price derived from the product list and applies it on the product description provided by the user to make a price prediction. Accordingly, neural network model 320 may also provide a price prediction for a variety of packaging options regarding the same product description. For example, neural network model 320 may provide predicted prices for a product having the product description provided by the user in operation 105 for various packaging options.

According to some embodiments, the price prediction, which is based on the product description provided by the user in operation 105, may be related to a product not yet introduced into the market. Therefore, obtaining a price prediction for such a product can be used to determine a price point for the product. This can be a powerful tool for a manufacturer who wants to manufacture and release a new product or for a retailer who needs to decide whether it makes financial sense to carry the product in stores or not.

Because the underlying data used to make the price prediction (e.g., the product list discussed above in reference to operation 115) is based on actual product pricing from one or more retailers, any inflated or depressed price points can influence the price prediction. Perhaps, some retailers may intentionally price a product higher than other retailers based, for example, on local market incentives (e.g., supply and demand) or other reasons. Therefore, using data from these retailers to establish a pricing relation would mean that the same higher price premium may artificially inflate the price prediction. Thus, as the underlying data changes, it is important to train the price prediction neural network model regularly to maintain accurate product description-price correlations and price predictions. In addition, training the price prediction neural network model regularly allows the model to capture product revaluations.

In some embodiments, the product list discussed above in reference to operation 115 is a training dataset used to train neural network model 320. Accordingly, the training dataset can be saved in a training library, such as training library 340 of server 210 shown in FIG. 3. In some embodiments, the training dataset includes, but it is not limited to, coded words from product descriptions, product unit information (e.g., packaging details, units per packaging, quantities, etc.), and product pricing (e.g., per unit, per packaging, etc.).

Figure 5:
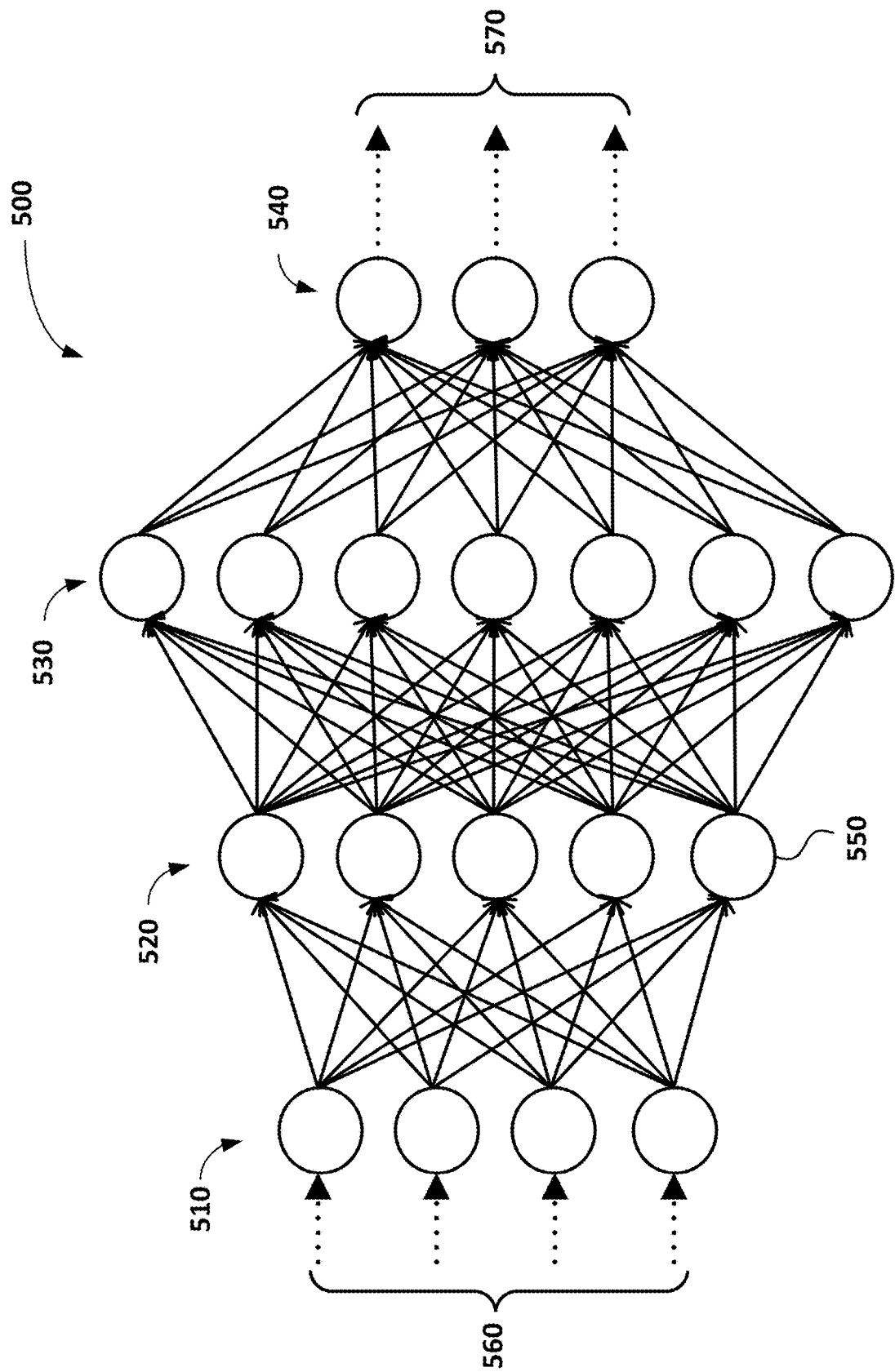
FIG. 5 is an exemplary representation of an artificial neural network model, according to some embodiments.

In some embodiments, the neural network is a deep-learning neural network with multiple layers where the inputs are the coded words from the product description and the output are the price predictions. By way of example and not limitation, FIG. 5 shows an exemplary representation of a neural network model 500 that can be used with method 100, like neural network model 320. In the representation of FIG. 5, neural network model 500 includes an input layer 510, two internal or hidden layers 520 and 530, and an output layer 540. However, this is not limiting and neural network model 500 may include additional or fewer hidden layers. Further, each layer may include additional or fewer nodes 550. In the representation of FIG. 5, input data 560 enter the network through input layer 510 and output data 570 exit from output layer 540.

Because the underlying principle is to convert all the n-grams and skip grams into binary values, a large vector of binary values is formed that corresponds to all words in various combinations/permutations. In some embodiments, the neural network model is merely a technique to connect the price across many observations to the vectors of binary values. For this reason, other standard modeling techniques may apply, such as decision trees and contingency tables or cross tabs. For instance, evaluating the average price for every combination and permutation of the binary values provides a distribution (mean and standard deviation) for every combination and permutation, which is the basis for a confidence interval for a price.

In some embodiments, the predicted pricing information for any combinations of words in the product description, and any additional information (e.g., pricing of different packaging options, etc.), are prepared and presented in the form of tables, graphs, or in any other useful format, for user 206 to review within software application 202. By way of example and not limitation, the results of the analysis can be saved in results data library 320 of server 210. By way of example and not limitation, one or more output engines may be responsible for aggregating the output from neural network model and presenting it in any appropriate format as discussed above. In some embodiments, the one or more output engines may be part of the analytics module 300 of server 210. Alternatively, the one or more output engines may belong to another server that is communicatively coupled to server 210. The one or more output engines and any additional servers that may be communicatively connected to server 210 are not shown in FIG. 3 for simplicity.

Figure 6:
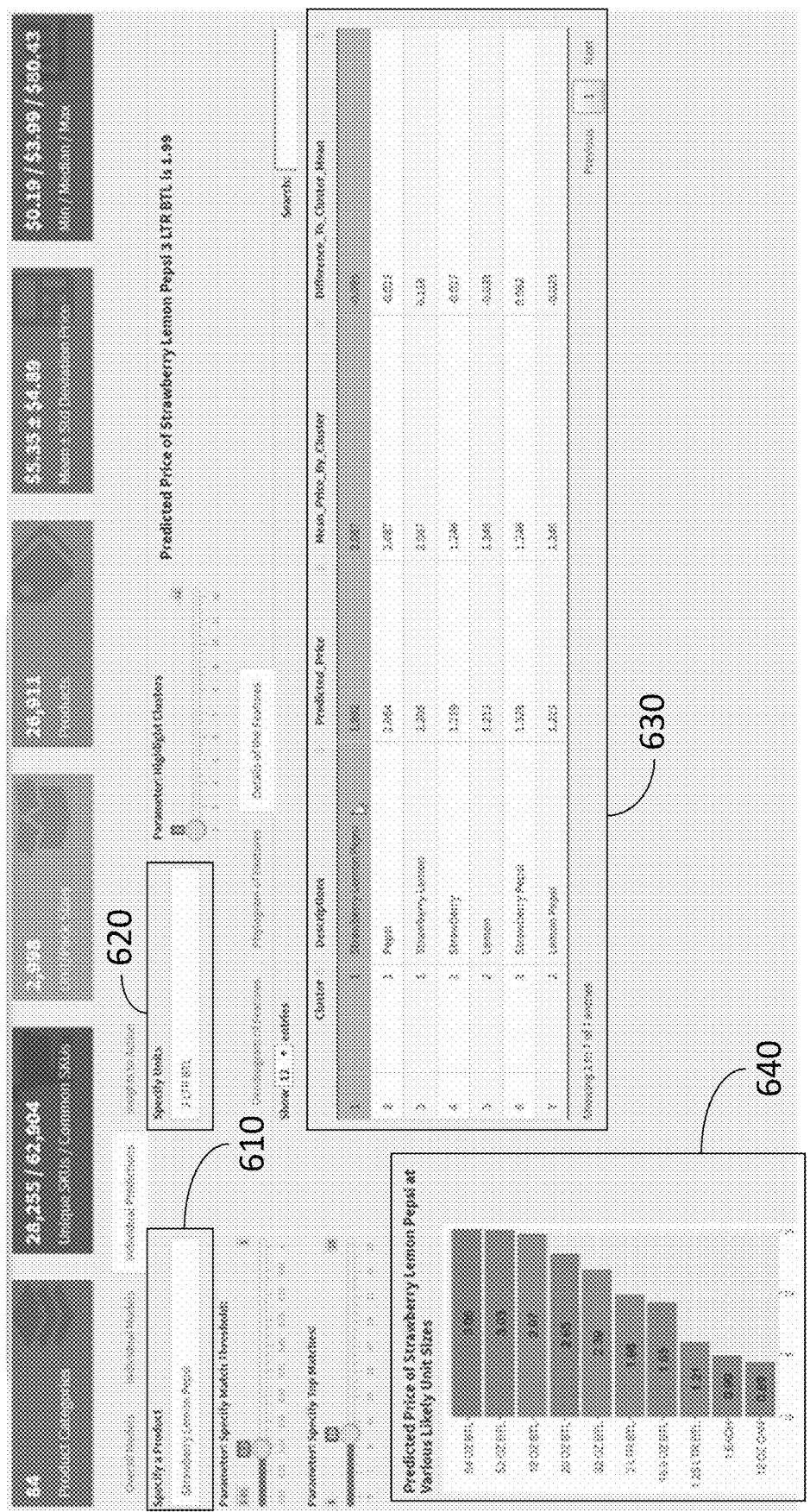
FIG. 6 is a screen shot from a software application that shows predicted pricing information based on a product's description, according to some embodiments.

According to some embodiments, FIG. 6 is an exemplary screen shot 600 from software application 202 (e.g., as viewed by user 206) that shows the price prediction results from server 210. In the example of FIG. 6, the product description corresponds to a fictitious product—e.g., a 3-liter bottle of Strawberry Lemon Pepsi, as indicated in fields 620 and 610 respectively. In table 630, a price prediction is provided for each combination of the terms in the product description (e.g., for Pepsi, Strawberry Lemon, Strawberry, Lemon, Strawberry Pepsi, and Lemon Pepsi) for a product size of a 3-liter bottle. From table 630, user 206 ascertains that for a 3-liter bottle the combination Strawberry Lemon yields a higher predicted price than the terms Strawberry and Lemon alone. Indeed, a 3-liter Strawberry Lemon Pepsi is predicted to be sold at a higher price than a 3-liter Strawberry Pepsi or a 3-liter Lemon Pepsi. However, a 3-liter Strawberry Lemon Pepsi would likely be priced lower than the regular 3-liter Pepsi. Consequently, the Strawberry Lemon combination, when added to a product like a 3-liter Pepsi, drops the value of the combination itself and the price of the product itself (e.g., the price of the 3-liter Pepsi). According to some embodiments, the above outcome may be different for a different product size—e.g., for an 8 oz bottle or can. Therefore, including the product size in the description is an important aspect of the analysis which may substantially influence the outcome (e.g., the price prediction and price correlations). In some embodiments, table 630 may include additional columns of data as shown in FIG. 6.

Further, screen shot 600 may include additional information in the form of plots such as bar chart 640, which shows the predicted prices of Strawberry Lemon Pepsi for different product containers. In some embodiments, screen shot 600 may be fully customizable. For example, screen shot 600 include information in addition to or in place of the information shown in FIG. 6. Further, the information in screen shot 600 may be rearranged or reconfigured based on user preferences. Consequently, alternative views for screen shot 600 are possible and within the spirit and the scope of this disclosure.

In some embodiments, the model and method disclosed herein can be used as a marketing survey tool that predicts prices for products that do not yet exist or for product unit/pack sizes not currently available in the market. Alternatively, the model presented herein can be used for products that already exist as a means to assess and audit a product's current pricing by comparing it to its predicted price. In response, manufacturers or retailers can make price adjustments to their products to increase their profit margin or boost sales.

According to some embodiments, by webscraping competitor retailers for their product prices and descriptions, the model described herein can be trained on competitor pricing. Thus, a retailer may predict the price of a product, as if it was to be carried by a competitor, as a means to benchmark its own pricing. In addition to the above, webscraping can provide some interesting insights. For instance, based on how competitors price their goods, a retailer can assess which types of products the competitors sell more—e.g., assuming that higher prices correspond to products with high demand and vice versa.

Webscraping from different sources (e.g., from different online retailers) and running the data with the same model, one can get a sense of the market in general. On the other hand, by running the same model on each competitor separately, and scoring one or more products, one can see which competitor would most likely carry the one or more products at the highest price point. This informs a retailer which competitor is relatively premium priced, suggests which competitor sells larger quantities of products (e.g., based on supply and demand), and enables the retailer to purposefully choose a price lower than the predicted to win over some of the market share.

The method and model described herein can also be used to score competitors' product prices to identify which products are priced lower than they should be, implying that management at the competitors' retail stores has chosen a lower price on purpose. Further, the method and system described herein can be used to move excess inventory or as a tool to compete. For example, a retailer can identify which of its product prices are higher than they should be, and thus, price these products purposefully lower as a means to aggressively compete.

In some embodiments, the model can be trained on retail pricing, procurement pricing, or any other relevant pricing.

According to some embodiments, the model and method disclosed herein can be used to calculate the price premium for a specific word or term. For example, the user may use the model and the method described herein to understand how a specific word or term influences the price of a product by comparing how the same term influences other products. For example, the word or term may not be an ingredient or a flavor. Instead, the word or term can be a product characteristic. For example, terms like light, professional, professional grade, heavy duty, durable, reinforced, safe, easy to use, low cost, affordable, comfortable, and the like. Therefore, the model and method disclosed herein can be used by commercial entities and marketing strategists as means to investigate how to best market a product based on features that people value and are willing to pay a premium for.

As discussed above, the model and method disclosed herein can be used for products and services alike as long as the pricing for similar products and services can be obtained to train the model. Consequently, the model and method disclosed herein can be applied to different markets including, but not limited to, apparel, cosmetics, personal hygiene, automobiles, property rentals and property sales, and all kinds of services to name a few. For example, a manufacturer or a retailer may use the method and model disclosed herein to investigate how a term, such as denim or cotton, may affect the price of a new jacket; or maybe an automaker wants to investigate whether customers are willing to pay a premium for a specific feature, such as a digital instrument cluster on a new vehicle (or any type of feature) by checking vehicle pricing from other competitor automakers within the segment that offer the same option in their vehicles. Similarly, a real estate developer may want to investigate how to competitively price a property that has certain features or amenities (such as granite countertops, a pool, hardwood floors, etc.) by checking the prices of properties in the area that offer the specific features or amenities and by having the model predict a price for a new property with these features. Likewise, a service provider may use the disclosed method and model to investigate whether customers value certain features or whether they are willing to pay a premium for these features by checking the pricing of competitor service providers or by obtaining a predicted price for a new service product.

In some embodiments, the disclosed model can be optimized for pricing projections within a specific geographical region or market in mind. For example, the model can be trained with data collected at city level, county level, state level, national level, international level, or global level. Further, the model can be trained with data collected from a specific cross-section of the population for a more targeted marketing.

Training the Neural Network Model

Figure 7:
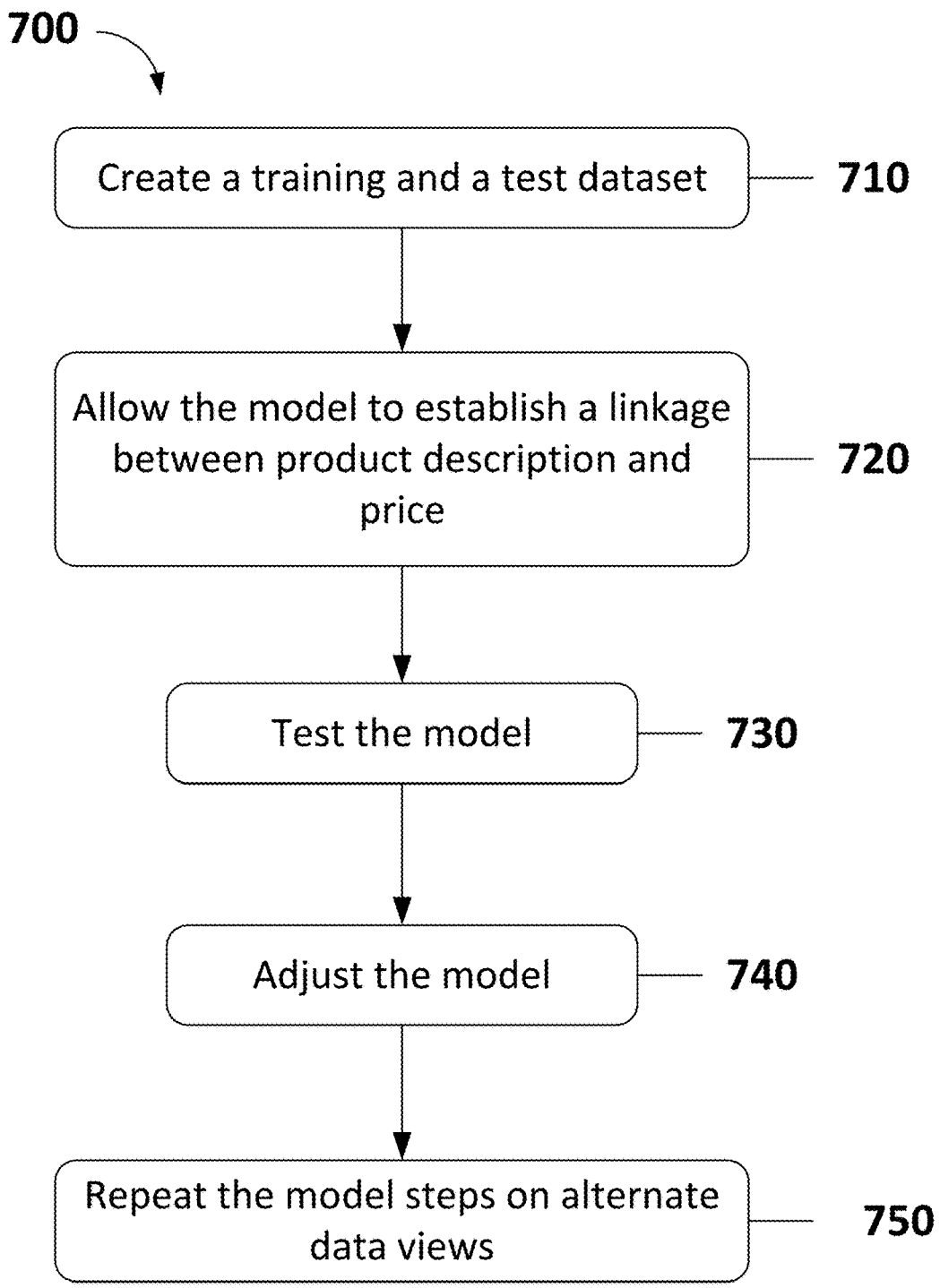
FIG. 7 shows a flow chart that describes the training process for an artificial neural network model, according to some embodiments.

As discussed above, flow chart 700 describes additional details about the training process of the neural network model. Other operations may be performed between the various operations of method 700 and may be omitted merely for clarity. This disclosure is not limited to this operational description. It is to be appreciated that additional operations may be performed. Moreover, not all operations may be needed to perform the disclosure provided herein. Additionally, some of the operations may be performed simultaneously, or in a different order than that shown in FIG. 7. In some embodiments, one or more other operations may be performed in addition to or in place of the presently described operations.

Flow chart 700 begins with step 710 and the process of creating a training dataset and a test dataset. In some embodiments, creating a training dataset and a test dataset includes randomly selecting 75% of all relevant products and their corresponding prices (obtained as described above and saved in product data library 330) as a training dataset and keeping the remaining 25% as a test dataset. The training and test datasets can be saved in training library 340 of server 210.

Flow chart 700 continues with step 720 where the model is allowed to establish a linkage between product description and price. In some embodiments, the model may use one or more regression models as discussed above to establish a correlation.

In some embodiments, the modeling process described above in step 720 is repeated for each term within the product's description and for each product in the training dataset.

In step 730 of flow chart 700, the model is tested. In some embodiments, testing the model includes using the test dataset on the model to check the performance of the predicted prices against the actual known prices.

In step 740 of flow chart 700, the model is adjusted (e.g., tweaked) based on the test results. In some embodiments, adjusting the model includes, but it is not limited to, adding or removing nodes from one or more layers of the multi-layer neural network, adding or removing layers from the multi-layer neural network, and/or testing different activation functions for one or more layers of the multi-layer neural network. In some embodiments, once the adjustments are made to the neural network, testing is repeated and a new round of adjustments may be made if the test results are not satisfactory—e.g., the difference between the projected price and the actual price of a product is outside a predetermined value.

In step 750 of flow chart 700, the previous steps of flow chart 700 (e.g., steps 710 through 740 are repeated. In some embodiments, the previous steps are repeated with different splits between the training data and the test data, or with new data altogether. Based on these splits, the model is tested and trained on additional or different datasets. This process may be repeated multiple times until the testing results are consistent (e.g., no longer improve), the predictions are consistent, and the margin of error is acceptable. In other words, the process is repeated until a "steady state" is achieved.

In some embodiments, once neural network model 320 is trained, it can be saved a one model in model library 350 of server 210 shown in FIG. 3. According to some embodiments, it is possible to develop different neural network models for different types of products or for different types of underlying training data. Therefore, one or more neural network models may be developed, saved, and retrieved from model library 350.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for predicting, assessing, and auditing prices of products or services, the method comprising:
receiving a product description for a product that describes the product in terms of type, brand, ingredients, and container size;
parsing the product description with a natural language processing (NLP) model to individual words, n-grams, and/or skip grams of different lengths;
obtaining a product list comprising product descriptions for other products with respective prices, wherein each product description in the product list includes at least combinations of the individual words, n-grams, and/or skip grams;
dividing the product list to a training dataset and a testing dataset, wherein the training and testing datasets are subsets of the product list;
training an artificial neural network (ANN) model with the training dataset so that the ANN model is able to determine how the individual words, n-grams, and/or skip grams or combinations thereof in the training dataset influence the prices of the products in the training dataset;

testing the trained ANN model with the testing dataset by allowing the trained ANN model to make price projections for the product descriptions in the testing dataset, comparing the price projections to respective prices of the product descriptions in the testing database, and making adjustments to the trained ANN model when a price projection for a product description is different from a respective price of the product description by a predetermined value; and after testing the trained ANN model, inputting the received product description to the ANN model to make one or more price predictions for the received product description, wherein the price predictions outputted from the ANN model are based on the container size and the combinations of the individual words, n-grams, and/or skip grams.

2. The method of claim 1, wherein parsing the product description with the NLP model comprises:
converting the individual words, n-grams, and/or skip grams of different lengths into searchable variables; and
using the searchable variables to obtain the product list.

3. The method of claim 1, wherein the NPL model is an NLP-based neural network model configured to (i) assign the individual words, n-grams, and/or skip grams, and combinations thereof a weight according to a predetermined importance, and (ii) prioritize them based on their assigned weight.

4. The method of claim 2, wherein the ANN model is a deep-learning model comprising multiple layers with inputs being the searchable variables corresponding to the individual words, n-grams, and/or skip grams of different lengths and outputs being price projections for the individual words, n-grams, and/or skip grams and combinations thereof.

5. The method of claim 1, wherein obtaining a product list comprises searching publicly available online resources.

6. The method of claim 1, wherein receiving the product description comprises a user entering the product description verbally or as text.

7. A system for predicting, assessing, and auditing prices of products or services, the system comprising:
a server comprising:
an analytics module with an artificial neural network (ANN) model and a natural language processing (NLP) model; and
data storage units communicatively coupled to the analytics module;
a network communicatively coupled to the server; and
a software application running on an electronic device communicatively coupled via the network to the server, wherein the software application is configured to:
receive a product description from a user operating the electronic device, the product description describing a product in terms of type, brand, ingredients, and container size; and
communicate the product description to the server, wherein the NLP model parses the product description into individual words, n-grams, and/or skip grams of different lengths and the ANN takes the parsed product description from the NLP model and makes one or more product price projection based on the container size and any combinations of the individual words, n-grams, and/or skip grams.

8. The system of claim 7, wherein the data storage units comprise an input data library, a results data library, a product data library, a training library, and a model library.

9. The system of claim 8, wherein:
the input data library stores the product description;
the results data library stores output data from the ANN model and the NLP model;
the product data library stores product information and product pricing used by the ANN model;
the training library stores training data for the ANN model; and
the model library stores one or more ANN models used in the analytics module.

10. The system of claim 7, wherein the electronic device is a smart phone device, a tablet, a tablet personal computer (PC), or a laptop PC.

11. The system of claim 7, wherein the ANN model is trained to determine how each of the container size, the individual words, n-grams, and/or skip grams influence a price of the product corresponding to the product description.

12. The system of claim 7, wherein the ANN model is trained with a list comprising:
products with respective product descriptions that include combinations of the container size, the individual words, n-grams, and/or skip grams found in the product description received by the user; and
respective current prices for each product in the list.

13. The system of claim 7, wherein the product description corresponds to a product not currently available for sale.

14. The system of claim 7, wherein the one or more product price projections outputted by the ANN are for one or more products having product descriptions with any of the combinations of the individual words, n-grams, and/or skip grams found in the received product description, and correspond to respective packaging options offered for the product that match the container size as indicated in the received product description.

15. A computer program product for predicting, assessing, and auditing prices of products or services, the computer program product comprising a non-transitory computer-readable medium having a computer readable program code stored thereon that when executed by one or more processors causes the computer program product to:
receive a product description for a product that describes the product in terms of type, brand, ingredients, and container size;
parse the product description with a natural language processing (NLP) model to individual words, n-grams, and/or skip grams of different lengths;
obtain a product list for other products comprising product descriptions with respective prices, wherein each product description in the product list includes at least combinations of the individual words, n-grams, and/or skip grams;
divide the product list to a training dataset and a testing dataset, wherein the training and testing datasets are subsets of the product list;
train an artificial neural network (ANN) model with the training dataset so that the ANN model is able to determine how the individual words, n-grams, and/or skip grams or combinations thereof in the training dataset influence the prices of the products in the training dataset;
test the trained ANN model with the testing dataset by allowing the trained ANN model to make price projections for the product descriptions in the testing dataset, compare the price projections to respective prices of the product descriptions in the testing database, and make adjustments to the trained ANN model when a price projection for a product description is different from a respective price of the product description by a predetermined value; and after testing the trained ANN model, input the received product description to the ANN model to make one or more price predictions for the received product description, wherein the price predictions outputted from the ANN model are based on the container size and the combinations of the individual words, n-grams, and/or skip grams.

16. The computer program product of claim 15, is further configured to:

convert the individual words, n-grams, and/or skip grams of different lengths into searchable variables; and use the searchable variables to obtain the product list.

17. The computer program product of claim 15, wherein the one or more price predictions are further based on respective packaging options offered for the product.

18. The computer program product of claim 16 wherein the ANN model is a deep-learning model comprising multiple layers with inputs being the searchable variables corresponding to the individual words, n-grams, and/or skip grams of different lengths and outputs being price projections for the individual words, n-grams, and/or skip grams and combinations thereof.

19. The computer program product of claim 15, wherein the ANN model is configured to make the one or more price predictions for a physical product or service.

20. The computer program product of claim 15, wherein the received product corresponds to a fictitious product.

* * * * *